United States Patent
Hutchings et al.

(10) Patent No.: US 9,961,480 B2
(45) Date of Patent: May 1, 2018

(54) AUTOMATIC SPEAKER SETUP

(71) Applicant: HARMAN INTERNATIONAL INDUSTRIES, INCORPORATED, Stamford, CT (US)

(72) Inventors: Jeffrey L. Hutchings, Lehi, UT (US); Richard A. Kreifeldt, South Jordan, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days. days.

(21) Appl. No.: 15/302,235

(22) PCT Filed: Apr. 10, 2015

(86) PCT No.: PCT/US2015/025310
§ 371 (c)(1),
(2) Date: Oct. 6, 2016

(87) PCT Pub. No.: WO2015/157633
PCT Pub. Date: Oct. 15, 2015

(65) Prior Publication Data
US 2017/0034648 A1 Feb. 2, 2017

Related U.S. Application Data

(60) Provisional application No. 61/977,791, filed on Apr. 10, 2014.

(51) Int. Cl.
*H04B 3/00* (2006.01)
*H04W 4/00* (2018.01)
(Continued)

(52) U.S. Cl.
CPC .............. *H04W 4/008* (2013.01); *H04R 3/04* (2013.01); *H04S 7/30* (2013.01); *H04R 2420/07* (2013.01)

(58) Field of Classification Search
CPC ..... H04W 4/008; H04R 3/04; H04R 2420/07; H04R 5/033; H04R 25/55; H04R 25/554; H04S 7/30
(Continued)

(56) References Cited

U.S. PATENT DOCUMENTS 9,455,768 B2 * 9/2016 Griffin ................ H04B 5/0031
2004/0037433 A1 2/2004 Chen
(Continued)

FOREIGN PATENT DOCUMENTS

EP 2582160 A1 4/2013

OTHER PUBLICATIONS

Home iBN26, "NFC Bluetooth Wireless Stereo Speaker System with Speakerphone and USB Charging", Instruction Manual, Jul. 23, 2012, 16 pages.
(Continued)

Primary Examiner — William A Jerez Lora
(74) Attorney, Agent, or Firm — Brooks Kushman P.C.

(57) ABSTRACT

In one embodiment, a computer-program product embodied in a non-transitory computer readable medium that is programmed for performing an automatic speaker setup is provided. The computer-program product includes instructions for wirelessly receiving, via Near Field Communication (NFC), speaker information for at least one speaker in a speaker system. The computer-program product further includes instructions wirelessly transmitting the speaker information to an audio control unit that transmits audio data to the at least one speaker based on the speaker information.

20 Claims, 3 Drawing Sheets

(51) Int. Cl.
*H04R 3/04* (2006.01)
*H04S 7/00* (2006.01)

(58) Field of Classification Search
USPC ............ 381/2, 3, 4, 6, 16, 77, 311, 315, 124
See application file for complete search history.

(56) References Cited

U.S. PATENT DOCUMENTS

| | | |
|---|---|---|
| 2004/0071294 A1* | 4/2004 | Halgas, Jr. ........... H04B 5/0006 |
| | | 381/59 |
| 2006/0258289 A1 | 11/2006 | Dua |
| 2008/0025535 A1 | 1/2008 | Rajapakse |
| 2009/0081948 A1 | 3/2009 | Banks et al. |
| 2010/0188212 A1 | 7/2010 | Jochelson |
| 2014/0112484 A1* | 4/2014 | Britt, Jr. ............... H04R 29/001 |
| | | 381/59 |
| 2015/0098596 A1* | 4/2015 | Noah ..................... H04S 7/301 |
| | | 381/303 |
| 2015/0215723 A1* | 7/2015 | Carlsson ................ H04S 7/307 |
| | | 381/307 |

OTHER PUBLICATIONS

Extended European Search Report for Application No. 15776036A, dated Mar. 8, 2017, 7 pages.
International Search Report and Written Opinion for Application No. PCT/US2015/025310, dated Jul. 8, 2015, 10 pages.

* cited by examiner

AUTOMATIC SPEAKER SETUP

CROSS-REFERENCE TO RELATED APPLICATION

This application is the U.S. national phase of PCT Application No. PCT/US2015/025310 filed Apr. 10, 2015, which claims the benefit of U.S. provisional Application No. 61/977,791 filed Apr. 10, 2014, the disclosures of which are hereby incorporated in their entirety by reference herein.

TECHNICAL FIELD

Aspects disclosed herein generally relate to an apparatus and/or method for automatically configuring (or setting up) one or more speakers with a signal processing and amplification unit.

BACKGROUND

The task of setting up a speaker, signal processing system and amplification system is presently a manual and potentially error-prone process. Generally, the user is required to manually enter a physical location for the speaker. This is a non-issue for wired speaker systems so long as the wiring is correct. However, this is not so clear for wireless speaker systems. Additionally, for professional systems, specific speaker parameters are loaded manually to ensure correct settings from transducer alignment delay, parametric equalizers, and gain matching. Moreover, current home systems that support automated room correction rely solely on measurements that are made during a calibration process which require the user to accurately place a microphone.

SUMMARY

In one embodiment, a computer-program product embodied in a non-transitory computer readable medium that is programmed for performing an automatic speaker setup is provided. The computer-program product includes instructions for wirelessly receiving, via Near Field Communication (NFC), speaker information for at least one speaker in a speaker system. The computer-program product further includes instructions wirelessly transmitting the speaker information to an audio control unit that transmits audio data to the at least one speaker based on the speaker information.

In another embodiment, an apparatus for performing an automatic speaker setup is provided. The apparatus includes a mobile device. The mobile device is configured to wirelessly receive, via NFC, speaker information for at least one speaker in a speaker system. The mobile device is further configured to wirelessly transmit the speaker information to an audio control unit that transmits audio data to the at least one speaker based on the speaker information.

In another embodiment, an apparatus for performing an automatic speaker setup is provided. The apparatus includes at least one loudspeaker that includes a first transceiver. The at least one loudspeaker is configured to wirelessly receive a request to provide speaker information. The at least one loudspeaker is further configured to wirelessly transmit the speaker information to a mobile device, via NFC, that provides the speaker information to an audio control unit.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
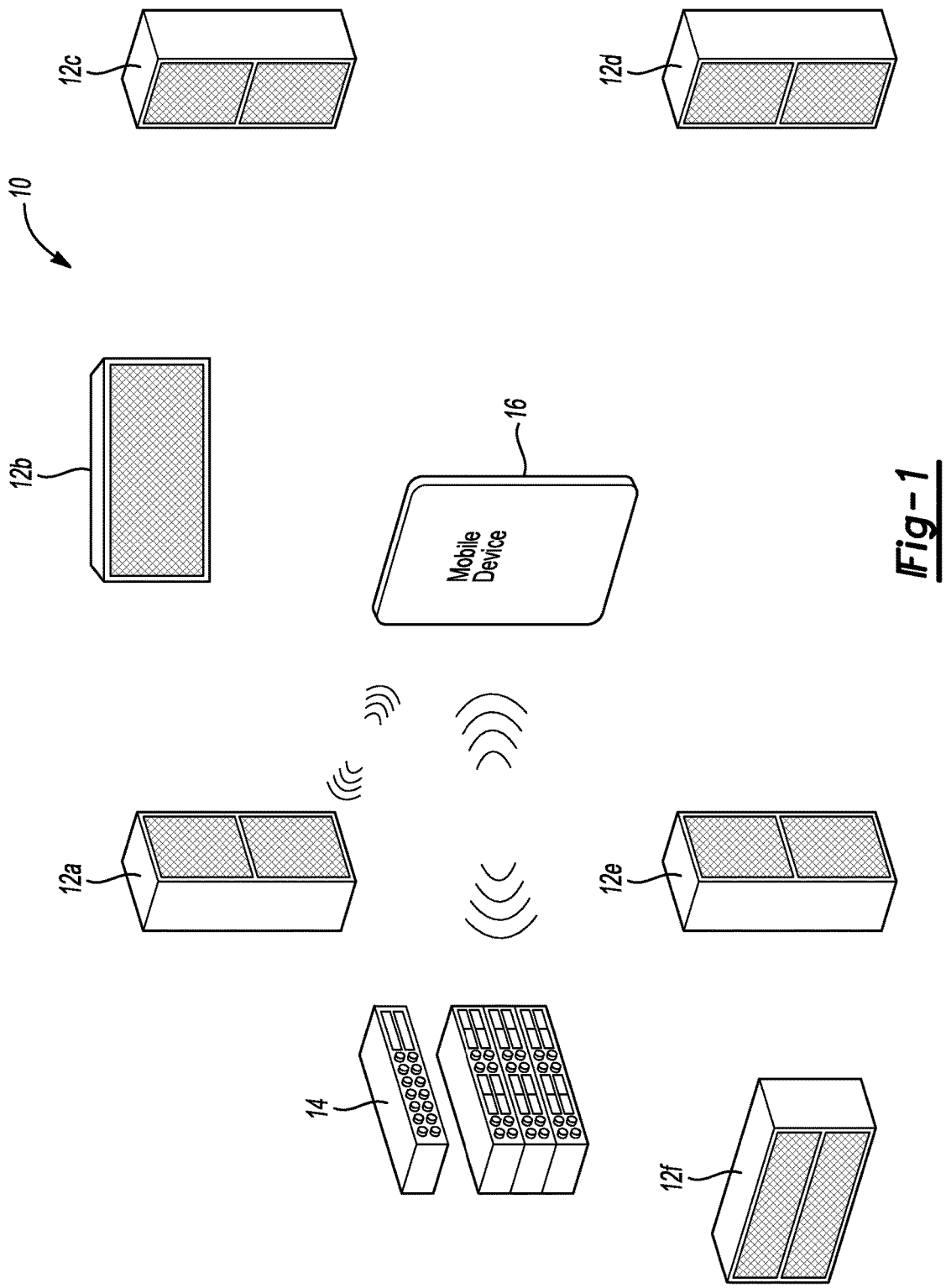
FIG. 1 depicts an apparatus for automatically setting up one or more speakers in accordance to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the teachings of the disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. Some of the description may specify a number of components that may be used or a spatial reference in a drawing such as above, below, inside, outside, etc. Any such spatial references, references to shapes, or references to the numbers of components that may be utilized are merely used for convenience and ease of illustration and description and should not be construed in any limiting manner.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure provides, but not limited to, a mobile device that is configured to wirelessly communicate with one or more speakers for obtaining speaker parameters. The mobile device may then wirelessly transmit such speaker parameters to a signal processing and amplification unit to configure the speakers to the signal processing and amplification unit. Such speaker parameters may include, but not limited to, speaker size values (e.g., small, medium, or large), alignment delay values, parametric equalizer (EQ) values, etc. In one example, the mobile device may communicate with the speakers via, a first protocol, such as Near Field Communication (NFC) to ascertain the speaker parameters. The mobile device may transmit the speaker parameters to the signal processing and amplification unit via another protocol, such as, WIFI, BLUETOOTH, or other suitable protocol. After the speaker parameters are provided to the signal processing and amplification unit, the unit provides an audio input to the speakers based on the speaker parameters via a hardwired interface. These aspects and more will be discussed in more detail below.

FIG. 1 depicts an apparatus 10 for automatically setting up one or more speakers 12a-12f (or "12") in accordance to one embodiment. The apparatus 10 generally includes the speakers 12 and a signal processing and amplification unit (hereafter "audio control unit" or "unit") 14. In general, the unit 14 and the speakers 12 may form a multichannel surround system. The speakers 12 generally comprise a left front speaker 12a, a center speaker 12b, a right front speaker 12c, a right surround speaker 12d, a left surround speaker 12e, and/or a subwoofer 12f. It is recognized that apparatus 10 may be used in connection with any one or more of the foregoing speakers 12 to perform speaker setup and that one or more of the foregoing speakers 12 need not be present to perform the setup.

A mobile device 16 wirelessly communicates with the speakers 12. The mobile device 16 may be a cell phone, laptop, or tablet, etc. The mobile device 16 is generally configured to obtain parameters from each speaker 12 and to transmit information corresponding to the parameters to the unit 14 to setup the speakers 12 (or to configure the speakers 12 to the unit 14). The mobile device 16 may include an application that is executed on hardware thereof for communicating with the speakers 12 and for transmitting the parameters to the unit 14. The unit 14 is configured to transmit audio data to the speakers 12 after the speaker information (or parameters) has been provided to the unit 14.

Figure 2:
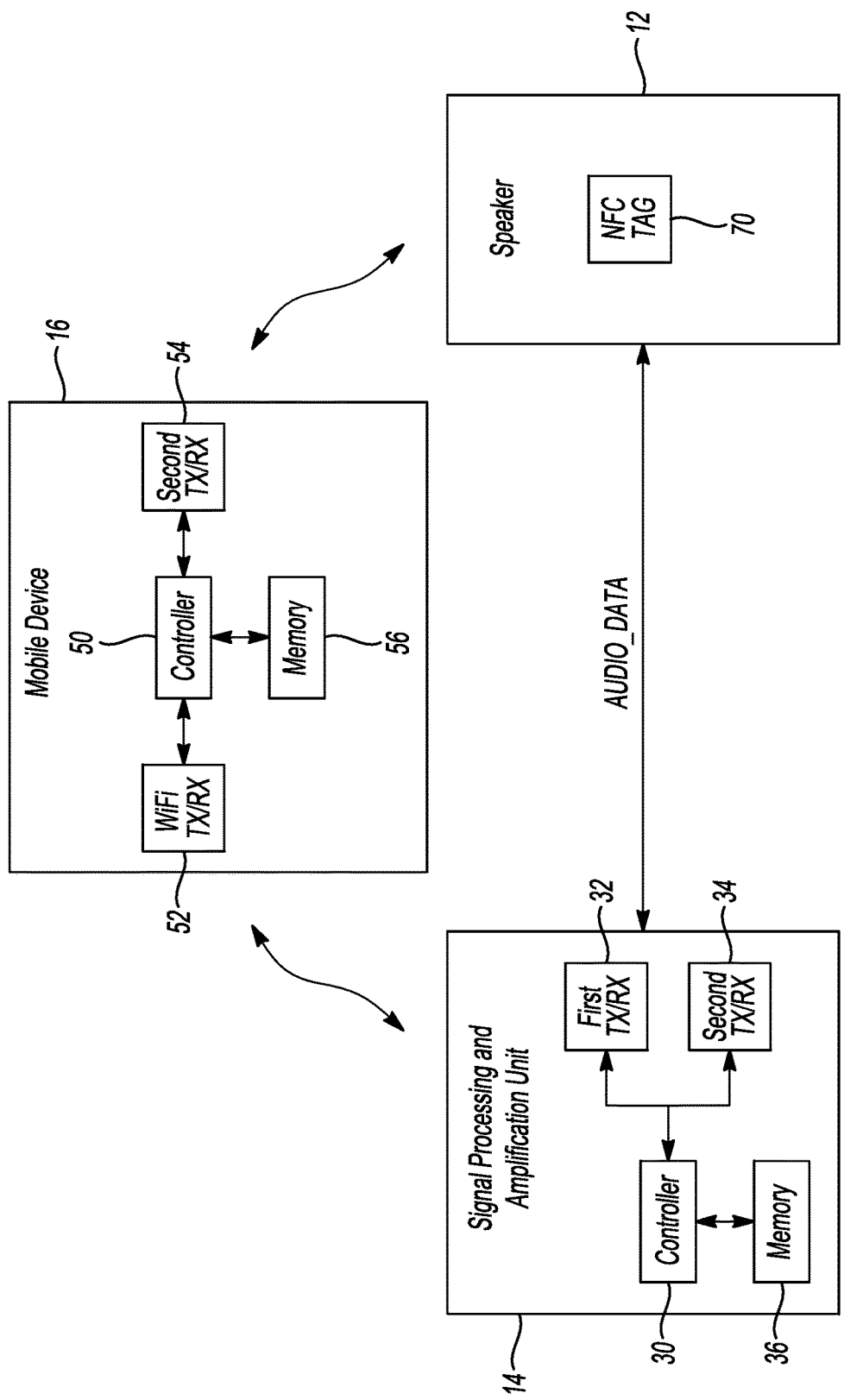
FIG. 2 depicts a more detailed diagram of the apparatus of FIG. 1.

FIG. 2 depicts a more detailed diagram of the apparatus 10 of FIG. 1. The unit 14 generally includes a controller 30, a first transceiver 32, and memory 36. In one example, the first transceiver 32 may be implemented as a WIFI transceiver for communicating with the mobile device 16. It is recognized that the first transceiver 32 may also be implemented as a BLUETOOTH transceiver or any other suitable protocol that enables communication between the unit 14 and the mobile device 16.

The mobile device 16 includes a controller 50, a first transceiver 52, a second transceiver 54, and memory 56. The first transceiver 52 may be implemented as a WIFI transceiver for communicating with the first transceiver 32 of the unit 14. It is recognized that the first transceiver 52 may also be implemented as a BLUETOOTH transceiver or any other suitable protocol that enables communication between the unit 14 and the mobile device 16. The second transceiver 54 may be implemented as an active NFC device 54 for receiving (or reading) the speaker parameters from the speaker 12. This aspect will be discussed in more detail below.

Each speaker 12 includes an NFC tag 70. The NFC tag 70 generally includes stored information corresponding to a plurality of speaker parameters. Such parameters include, but not limited to, speaker size (e.g., small, medium, large, used by a significant number of correction systems), alignment delays, and parameter equalizers ("EQ"). The unit 14 (e.g., the signal processing portion of the unit 14) may use the alignment delays to align acoustic fields of each transducer in the speaker 12. A particular speaker 12 may include a high-frequency driver (e.g., tweeter) and a low-frequency driver (e.g., woofer). These drivers are not the same and may output audio data that is received at a listening point at different times. For example, audio data from a tweeter may arrive at the listening position earlier than the audio data from a woofer. Thus, the unit 14 may electrically align the delay (or remove the delay) between the tweeter and the woofer by, for example, employing a phase shift in the audio output from the tweeter to time align the tweeter and the woofer to ensure receipt of the audio data generally at the same time at the listening position. The parametric EQ provides transducer equalization that is required to obtain a "flat" frequency response from the speaker 12.

In general, the active NFC device 54 of the mobile device 16 is configured to read the parameters (e.g., speaker size, alignment delays, and parameter EQ) from the NFC tag 70 for each speaker 12 that is desired to be configured to the unit 14. The NFC tag 70 in the speaker 12 may be passive or active. Assuming the NFC tag 70 is passive, the following describes the manner in which the active NFC device 54 communicates with the passive NFC tag 70. A power supply (not shown) in the mobile device 16 may power the active NFC device 54 to generate a magnetic field when it is desired to read the speaker parameters. The mobile device 16 is generally positioned proximate to the speaker 12 in order to read the parameters. In response to the magnetic field, the NFC tag 70 of the speaker 12 generates a radio field that includes information corresponding to the speaker parameters. The NFC tag 70 is passive and generates the radio field with the power from the magnetic field as provided from the active NFC device 54. The active NFC device 54 receives the radio field and the controller 50 decodes the information (i.e., the speaker parameters). Such information may be stored in the memory 56 of the mobile device 16. It is also recognized that the NFC tag 70 in the speaker 12 may also be an active NFC device.

The first transceiver 52 of the mobile device 16 then transmits information corresponding to the speaker information to the first transceiver 32 of the unit 14. As noted above, this may be transmitted via WIFI or other suitable method. The controller 30 of the unit 14 configures a signal processor (not shown) with the speaker parameters (or settings) and the speaker's position (e.g., left front, center, right front, right surround, left surround, and/or subwoofer) in, for example, a multichannel setup. Automatic room correction may also be used to then correct for room modes, etc. The second transceiver 34 of the unit 14 may transmit amplified audio content to the speaker(s) 12 via a hardwired connection after speaker setup.

Figure 3:
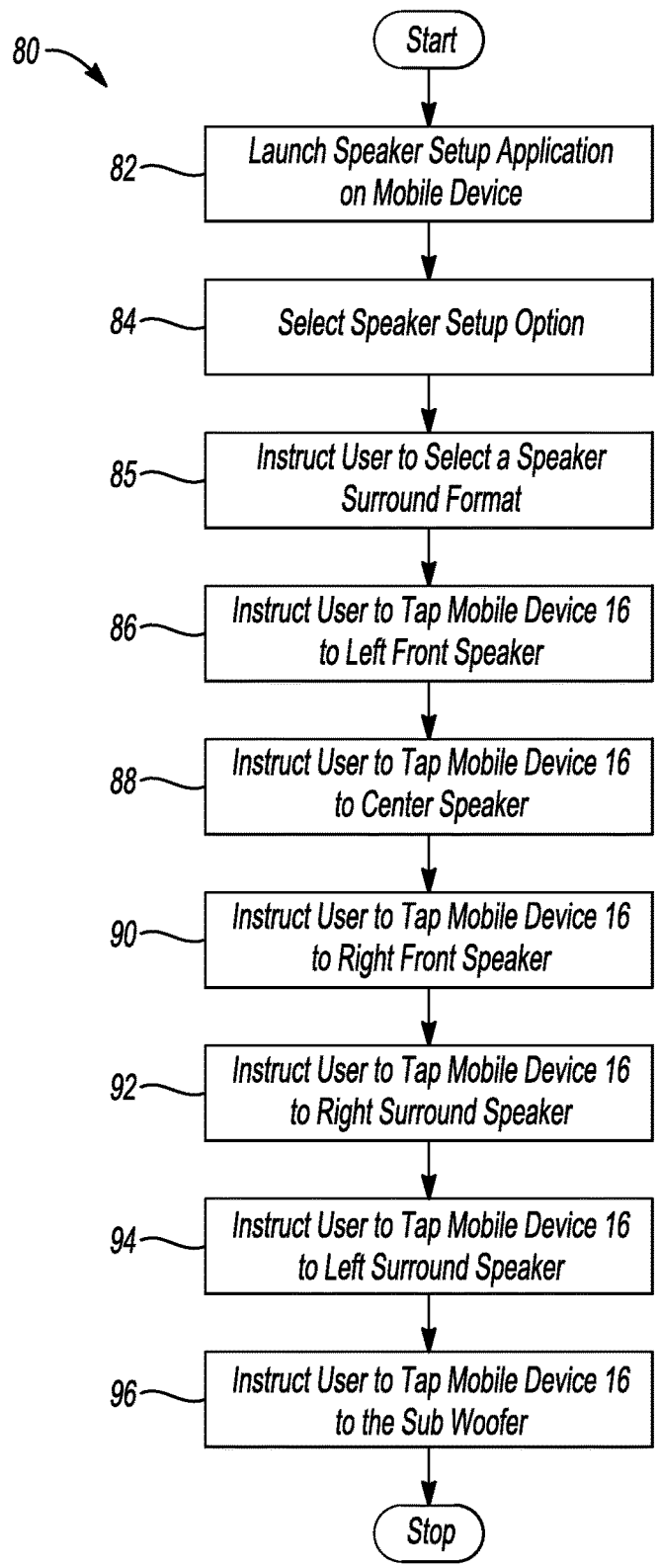
FIG. 3 depicts a method for automatically setting up the one or more speakers in accordance to one embodiment.

FIGS. 3 depicts a method 80 for automatically setting up the one or more speakers in accordance to one embodiment In operation 82, the mobile device 16 launches a speaker setup application in response to a user indicating a desire to perform the automatic speaker setup. The mobile device 16 then guides the user for performing the speaker setup.

In operation 84, the mobile device 16 receives a command from the user to proceed with the speaker setup.

In operation 85, the mobile device 16 may prompt the user to select a particular surround-sound format such as, for example, 5.1, 6.1, 7.1, 9.2, Pro-Logic llx, Pro-Logic llx, Dolby DSX, etc.

In operation 86, a display (not shown) on the mobile device 16 instructs the user to tap the mobile device 16 to the left front speaker 12*a*. It is recognized that the mobile device 16 prompts or instructs the user to tap a speaker at a corresponding location based on a predetermined sequence of locations. This may vary based on the particular surround-sound format that is entered as noted in connection with operation 85. The left front speaker 12*a* then transfers the speaker parameters to the mobile device 16 which then transmits the same to the unit 14.

In operation 88, the mobile device 16 then instructs the user to tap the mobile device 16 to the center speaker 12*b*. The center speaker 12*b* then transfers the speaker parameters to the mobile device 16 which then transmits the same to the unit 14.

In operation 90, the mobile device 16 then instructs the user to tap the mobile device 16 to the right front speaker 12*c*. The right front speaker 12*c* then transfers the speaker parameters to the mobile device 16 which then transmits the same to the unit 14.

In operation 92, the mobile device 16 then instructs the user to tap the mobile device 16 to the right surround speaker 12*d*. The right surround speaker 12*d* then transfers the speaker parameters to the mobile device 16 which then transmits the same to the unit 14.

In operation 94, the mobile device 16 then instructs the user to tap the mobile device 16 to the left surround speaker 12*e*. The center speaker 12*b* then transfers the speaker parameters to the mobile device 16 which then transmits the same to the unit 14.

In operation 96, the mobile device 16 then instructs the user to tap the mobile device 16 to the subwoofer 12*f*. The subwoofer 12*f* then transfers the speaker parameters to the mobile device 16 which then transmits the same to the unit 14.

As noted above, the mobile device 16 generally instructs the user to tap a corresponding speaker 12 based on a predetermined sequence of locations that may be based on the speaker format as entered in operation 85 above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-program product embodied in a non-transitory computer readable medium that is programmed for performing an automatic speaker setup, the computer-program product comprising instructions for:
   wirelessly receiving, via Near Field Communication (NFC) at a mobile device, speaker information from at least one speaker in a speaker system, the speaker information including a speaker size for the at least one speaker;
   processing the speaker information at the mobile device; and
   wirelessly transmitting the speaker information from the mobile device to an audio control unit that includes a transceiver to transmit audio data to the at least one speaker based on the speaker information.

2. The computer-program product of claim 1 further comprising wirelessly transmitting the speaker information to the audio control unit via a first wireless protocol that is different than the NFC.

3. The computer-program product of claim 2 wherein the first wireless protocol includes one of WIFI and BLUETOOTH.

4. The computer-program product of claim 1 wherein the speaker information corresponds to at least one alignment delay value and at least one parameter equalizer value for the at least one speaker.

5. The computer-program product of claim 1 further comprising instructions for wirelessly receiving, via the NFC, speaker information from an NFC tag positioned on the at least one speaker.

6. The computer-program product of claim 5 further comprising instructions for generating a magnetic field for transmission to the NFC tag to request the speaker information for the at least one speaker in the speaker system prior to wirelessly receiving the speaker information.

7. The computer-program product of claim 1 further comprising instructions for receiving the speaker information via an active NFC tag.

8. An apparatus for performing an automatic speaker setup, the apparatus comprising:
   a mobile device configured to:
      wirelessly receive, via Near Field Communication (NFC), speaker information from at least one speaker in a speaker system, the speaker information including a speaker size for the at least one speaker; and
      wirelessly transmit the speaker information to an audio control unit that includes a transceiver to transmit audio data to the at least one speaker based on the speaker information.

9. The apparatus of claim 8 wherein the mobile device is configured to wirelessly transmit the speaker information to the audio control unit via a first wireless protocol that is different than the NFC.

10. The apparatus of claim 9 wherein the first wireless protocol includes one of WIFI and BLUETOOTH.

11. The apparatus of claim 8 wherein the speaker information corresponds to at least one alignment delay value and at least one parameter equalizer value for the at least one speaker.

12. The apparatus of claim 8 wherein the mobile device is further configured to wirelessly receive, via the NFC, speaker information from an NFC tag positioned on the at least one speaker.

13. The apparatus of claim 12 wherein the mobile device is further configured to generate a magnetic field for transmission to the NFC tag to request the speaker information from the at least one speaker in the speaker system prior to wirelessly receiving the speaker information.

14. The apparatus of claim 8 wherein the mobile device includes a first transceiver configured to receive the speaker information from the at least one speaker.

15. The apparatus of claim 14 wherein the first transceiver is an active NFC tag.

16. The apparatus of claim 14 wherein the mobile device includes a second transceiver configured to transmit the speaker information to the audio control unit for storage thereon.

17. The apparatus of claim 8 wherein the mobile device is one of a cell phone, tablet, and laptop computer.

18. An apparatus for performing an automatic speaker setup, the apparatus comprising:
- at least one loudspeaker including a first transceiver configured to:
  - wirelessly receive a request to provide speaker information;
  - wirelessly transmit the speaker information including a speaker size for the at least one loudspeaker to a mobile device via Near Field Communication (NFC) that provides the speaker information to a transceiver of an audio control unit; and
  - wirelessly receive audio data based on the speaker information from the audio control unit.

19. The apparatus of claim 18 wherein the speaker information corresponds to at least one alignment delay value and at least one parameter equalizer value for the at least one loudspeaker.

20. The apparatus of claim 18 wherein the first transceiver is a passive NFC tag for receiving a magnetic field to provide the speaker information to the mobile device.

* * * * *